(12) United States Patent
Douglas

(10) Patent No.: US 10,473,842 B2
(45) Date of Patent: Nov. 12, 2019

(54) WIDE DISPERSION SOURCE MULTIPLE PATH LIGHT DIRECTION SYSTEM

(71) Applicant: David Douglas, Oak Park, MI (US)

(72) Inventor: David Douglas, Oak Park, MI (US)

(73) Assignee: Q Technology, Inc., Livermore, CA (US)

( * ) Notice: Subject to any disclaimer, the term of this patent is extended or adjusted under 35 U.S.C. 154(b) by 0 days.

(21) Appl. No.: 16/152,407

(22) Filed: Oct. 4, 2018

(65) Prior Publication Data

US 2019/0101682 A1     Apr. 4, 2019

Related U.S. Application Data

(60) Provisional application No. 62/568,282, filed on Oct. 4, 2017.

(51) Int. Cl.

| | | |
|---|---|---|
| *F21V 8/00* | (2006.01) | |
| *G02B 26/08* | (2006.01) | |
| *F21K 9/68* | (2016.01) | |
| *F21K 9/66* | (2016.01) | |
| *F21V 3/02* | (2006.01) | |
| *F21V 7/00* | (2006.01) | |
| *F21V 7/05* | (2006.01) | |
| *F21S 4/28* | (2016.01) | |
| *F21Y 115/10* | (2016.01) | |

(52) U.S. Cl.
CPC ............. *G02B 6/0018* (2013.01); *F21K 9/66* (2016.08); *F21K 9/68* (2016.08); *F21S 4/28* (2016.01); *F21V 3/02* (2013.01); *F21V 7/0016* (2013.01); *F21V 7/05* (2013.01); *G02B 26/0816* (2013.01); *F21Y 2115/10* (2016.08)

(58) Field of Classification Search
CPC ..... G02B 6/0018; G02B 26/0816; F21S 4/28; F21K 9/66; F21K 9/68; F21V 3/02; F21V 7/0016; F21V 7/05; F21V 29/77; F21V 29/773; F21Y 2115/10; A47F 3/00
See application file for complete search history.

(56) References Cited

U.S. PATENT DOCUMENTS

| | | | | |
|---|---|---|---|---|
| 4,395,080 | A * | 7/1983 | Winn | A47F 3/00 312/111 |
| 6,441,943 | B1 * | 8/2002 | Roberts | B60Q 1/2665 359/267 |
| 8,272,755 | B2 * | 9/2012 | Oketani | A47F 3/001 362/125 |
| 8,985,795 | B2 * | 3/2015 | Thomas | F21V 21/00 362/92 |
| 2005/0265019 | A1 * | 12/2005 | Sommers | A47F 3/001 362/217.16 |
| 2012/0051051 | A1 * | 3/2012 | Kauffman | F21V 5/007 362/244 |
| 2014/0254134 | A1 * | 9/2014 | Pelka | F25D 27/00 362/92 |

* cited by examiner

*Primary Examiner* — Mary Ellen Bowman
(74) *Attorney, Agent, or Firm* — Theodore C. Huff

(57) ABSTRACT

A lighting system uses optics to redirect stray light from unlensed LEDs toward a desired region while avoiding hot spots. The optics involve essentially planar surfaces with both reflective and light transmissive characteristics. The lighting system may be used in display cases.

2 Claims, 5 Drawing Sheets

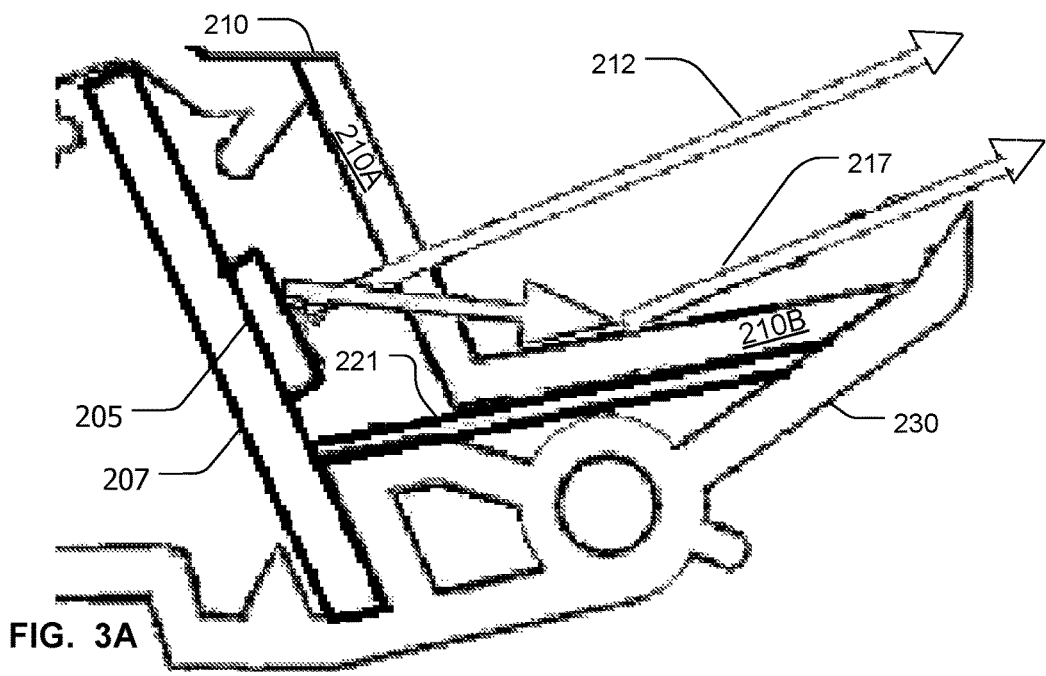
FIG. 3A
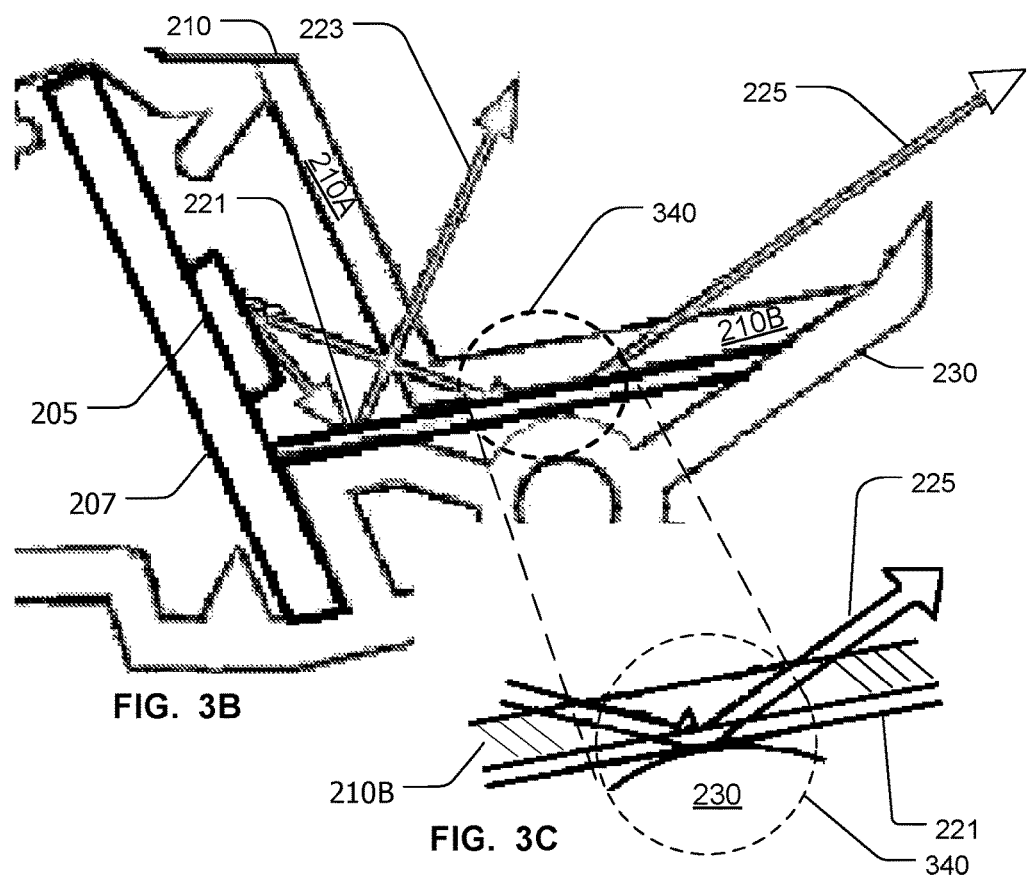
FIG. 3B
FIG. 3C

US 10,473,842 B2

WIDE DISPERSION SOURCE MULTIPLE PATH LIGHT DIRECTION SYSTEM

REFERENCE TO RELATED APPLICATIONS

This application claims the benefit, under 35 USC sections 119 and 120, of the filing date of a U.S. Provisional Application Ser. No. 62/568,282, filed on Oct. 4, 2017, entitled, "WIDE DISPERSION SOURCE MULTIPLE PATH LIGHT DIRECTION SYSTEM", the entirety of which is incorporated by reference herein and priority of which is claimed herein.

BACKGROUND

The present invention relates generally to lighting systems. More specifically, this invention relates to LED lighting systems using various optical elements to direct light rays emitted preferably from unlensed LEDs or possibly from other wide dispersion angle light sources.

SUMMARY

While a trend in prior art lighting illumination systems is to apply lenses for concentrating LED light toward objects and areas to be illuminated, this has disadvantages. (Here, a lensed LED is defined as being an LED with an essentially dome top, the dome functioning as a lens.) Hot spots may occur when lensed LEDs produce directed beams, or even just higher intensities along various angles, as part of their lighting profile. The manifestation of hot spots as brighter areas on objects can distort their appearance. The hot spots can also be difficult to look at without glare or discomfort.

FIG. 1A shows a hypothetical display case. For the sake of clarity, elements 112, 114, and 116 are structural elements that connect a display case shelf and top cover, for example. Regions 177 represent clear portions of doors, or open space allowing items within to be viewable from the outside.

Ideally, for example as in FIG. 1A, within a display case 101A the primary orientation of light emission as depicted through rays 105 should be toward the objects on display on shelf 130, for example items 140 and 150 as shown. This light directivity was generally accomplished through use of lensed LEDs with possible hot spot disadvantages.

The alternative use of as an unlensed LED 190 as shown in FIG. 1B can have the disadvantage of producing some rays 195 that are not directed toward objects on display inside case 101B. Instead these rays may leave the display case, departing through region 197, allowing light to emerge from the display case whether via an open pathway or light transmissive material. This results in the double problem of possible glare to passersby, and "waste" light that is not being used to illuminate a product.

The present invention remedies these situations. Through use of optic elements which may be planar and easily constructed, stray light from unlensed LEDs may be redirected to shine within a display case and put to good use, while avoiding hot spots.

BRIEF DESCRIPTION OF THE DRAWINGS

FIG. 3A shows a portion of the second lighting configuration, with only direct and outer surface reflected rays;

FIG. 3B shows the same portion of the second lighting configuration as in FIG. 3A, but alternatively with inner surface reflected rays;

FIG. 3C is a close up of an inner surface mirrored ray and its surroundings.

DETAILED DESCRIPTION

Figure 2A:
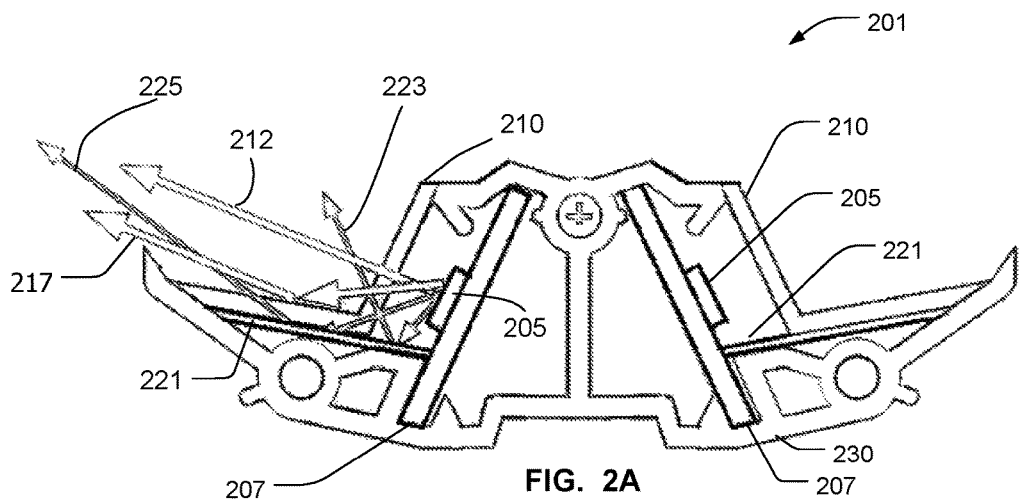
FIG. 2A is a cross-sectional view illustrating an example lighting configuration in accordance with the present invention, and rays emitted from one side of the configuration.

FIG. 2A shows a lighting configuration 201 featuring an LED emitter 205 on a substrate 207. An example LED for use with this particular geometry is the PLCC 2835 HE series manufactured by Edison Opto Corporation of Taiwan. The lighting configuration 201 has bilateral symmetry with two sides being essentially mirror images of each other.

The clear material comprising optical adapter 210 is substantially 'L' shaped with one region 210A allowing light from LED 205 to go directly through, and another flat region 210B at an angle away from the LED 205. This other flat region 210B allows surface reflection to take place, as shown with ray 217.

The clear material comprising the L shaped piece 210 may be made of PVC (polyvinyl chloride) or other transparent material and produced through extrusion. The direction of the light being redirected may be influenced by refraction within or internal reflection from optical material used to make 210. The reflective material for element 221 may be metallized or of a light color, for example white. Also having a special reflective element 221 may not be needed for light distribution, because even a black shell 230 casing may be glossy enough to contribute much reflected light.

As a result of the presence of clear material 210 and reflective material 221, rays ("direct ray" 212, "inner surface reflected rays" 223 and 225, and "outer surface reflected ray" 217) are emitted at various angles.

Figure 2B:
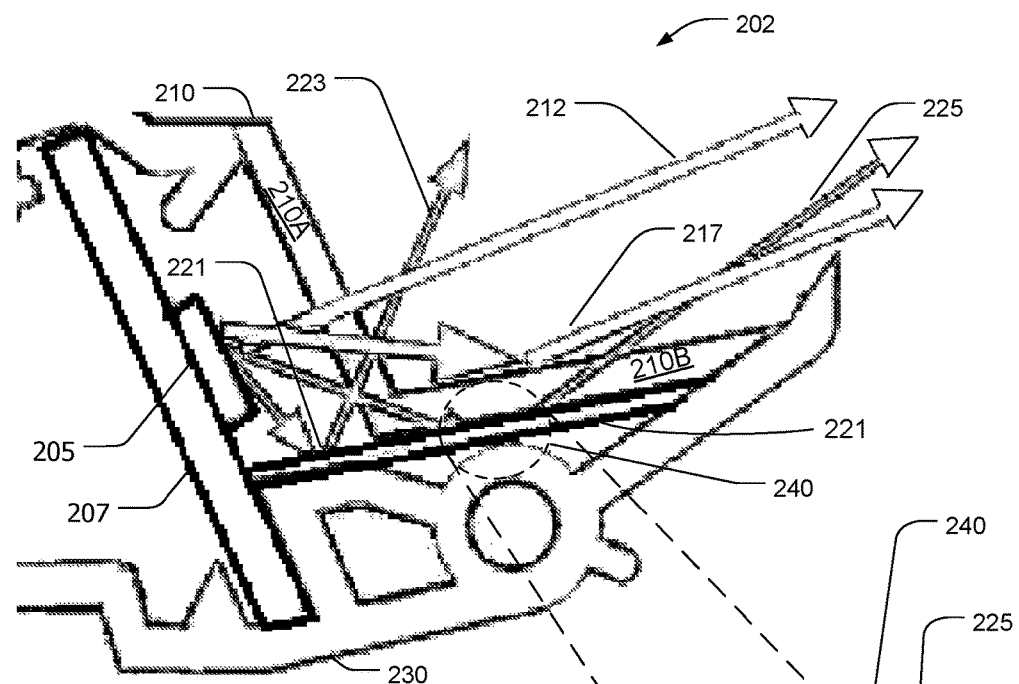
FIG. 2B is a close up view of a portion of a second example lighting configuration emphasizing a typical emergent ray pattern.

FIG. 2B shows a close up 202 of a second configuration resembling the right half of FIG. 2A, with light rays emitted in a mirror image fashion to that shown in FIG. 2A, showing the setup is not dependent on a specific orientation, and in fact two symmetrical setups may be placed adjacent to each other. This FIG. 2B closeup 202 details ray 212 directly emitted from the LED 205, and going through optical portion 210A.

FIG. 2B also shows ray 217 reflected from the optical adapter 210 along the portion of 210B proximal to LED 205. FIG. 2B also shows rays 223 and 225 that take a path through optical adapter portion 210B, reflect from the material 221, and travel back out through 210B.

Figure 2C:
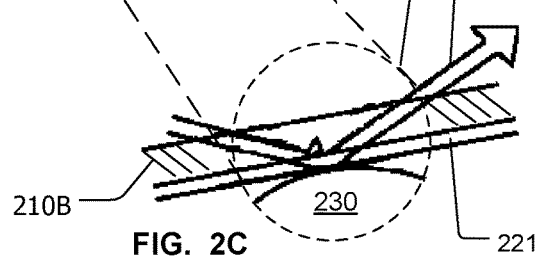
FIG. 2C is an even more magnified view featuring a ray trace and surroundings.

The optical pathway via region 210B that allows light to travel within to a reflector 221 and back out is featured through inset 240 of FIG. 2B, that is shown magnified in FIG. 2C. Here ray 225 is shown reflecting off reflective material 221. Shell 230 helps physically support reflective material 221. The clear material 210B is shown playing a passive role in allowing light to reach reflective material 221.

FIGS. 3A, 3B, and 3C show subsets of FIGS. 2A-2C ray traces to emphasize various optical modes.

FIG. 3A shows only a direct ray 212 and a 210 surface reflected ray 217. FIG. 3B shows only surface 221 reflected rays 223 and 225.

Inset 340 of FIG. 3B is shown magnified in FIG. 3C. Here ray 225 is shown traveling through adapter portion 210B, reflecting off surface 221, and finally traveling back out through adapter portion 210B.

Again, the benefit of having optical elements 210 and 221 is to redirect rays 217, 223, and 225 from LED 205 which otherwise would not be available to light within the display case. While optical element 210 is shown as a substantially contiguous L-shaped piece in FIGS. 2 and 3, the optical adapter regions 210A and 210B may be two or more separate pieces.

Figure 4:
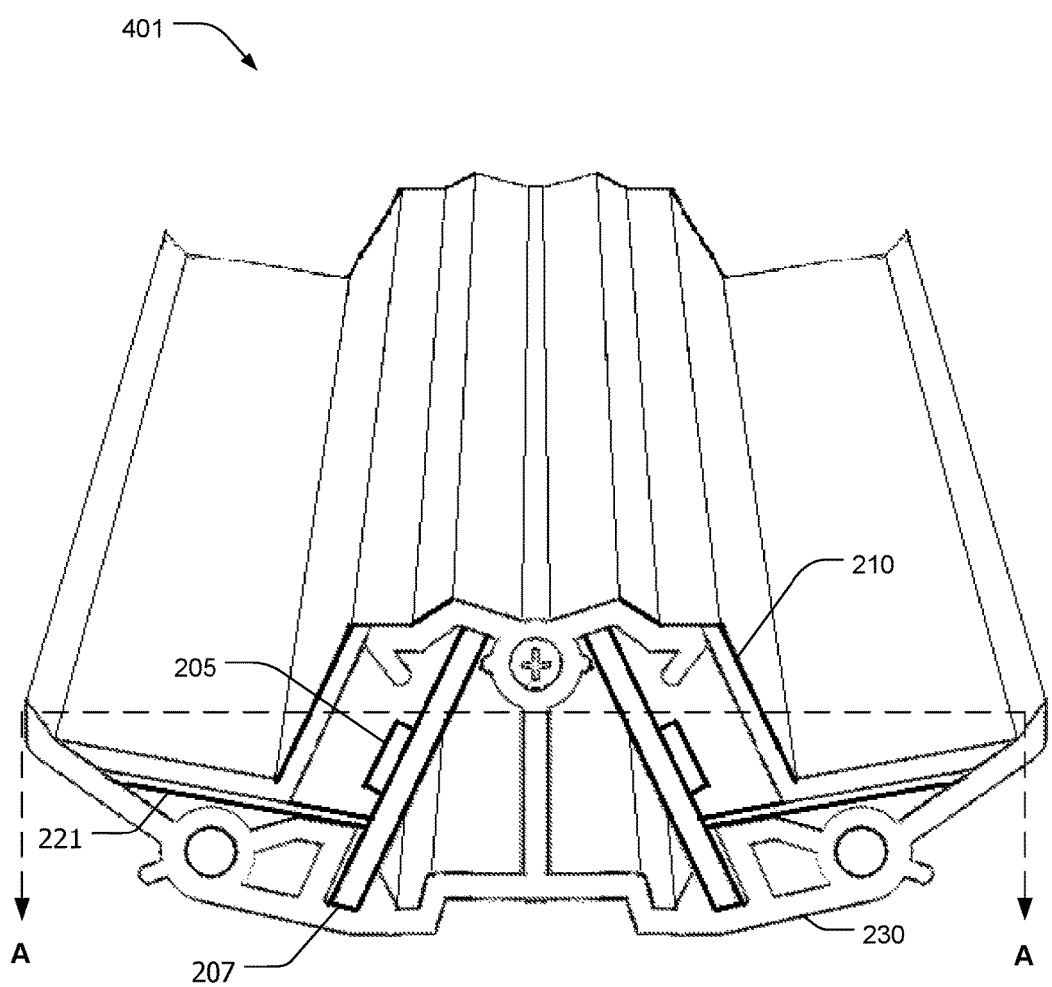
FIG. 4 is a perspective view of the first example lighting configuration

FIG. 4 shows in perspective view the optical framework 401 based on the configuration shown in FIG. 2A, from which the cross-section view in FIG. 2A may be seen facing arrows A-A. Consistent with FIG. 2A, this design features at least one LED 405, at least one substrate 407, at least one L-shaped piece 410, an optional mirrored piece 421, and the shell 430.

Figure 1A:
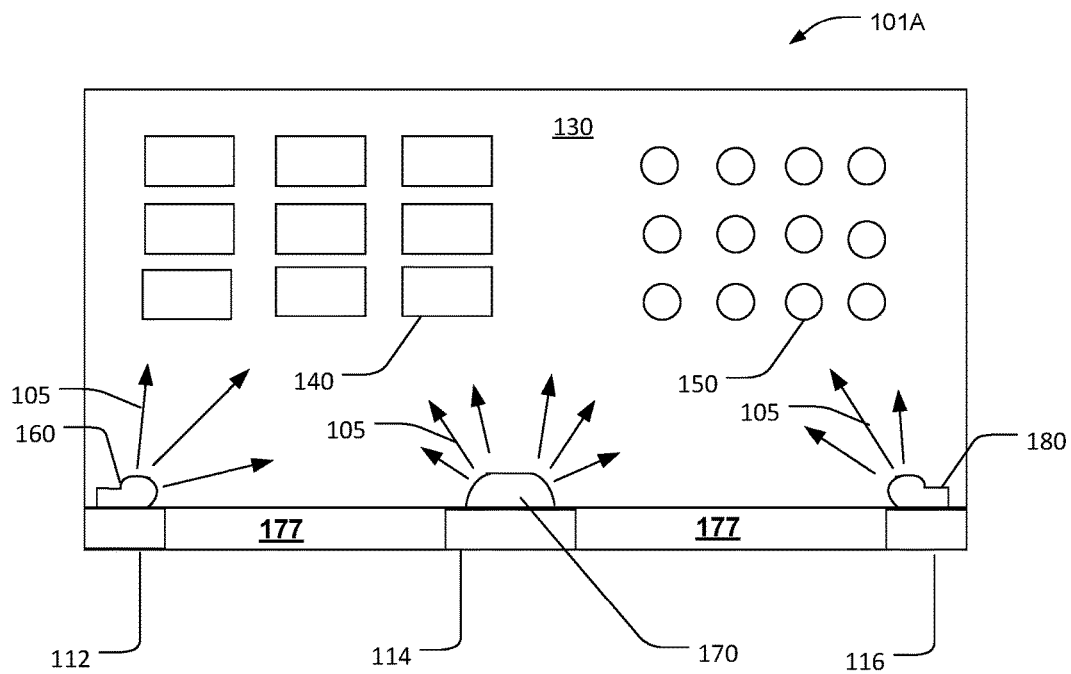
FIG. 1A is an example of how light direction in a display case should operate.
Figure 1B:
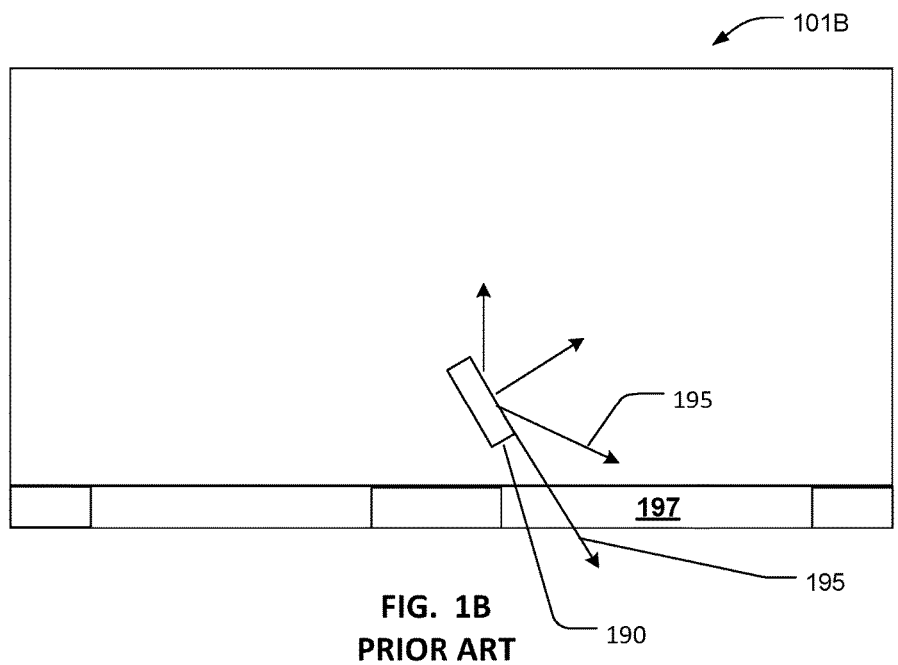
FIG. 1B is an example of how use of a non-lensed LED by itself can result in at least some light emission toward the outside of a display case.

The optical framework 401 in FIG. 4 may be placed as a substitute module in place of a prior art module that would otherwise be used as module 170 in FIG. 1A.

Figure 5:
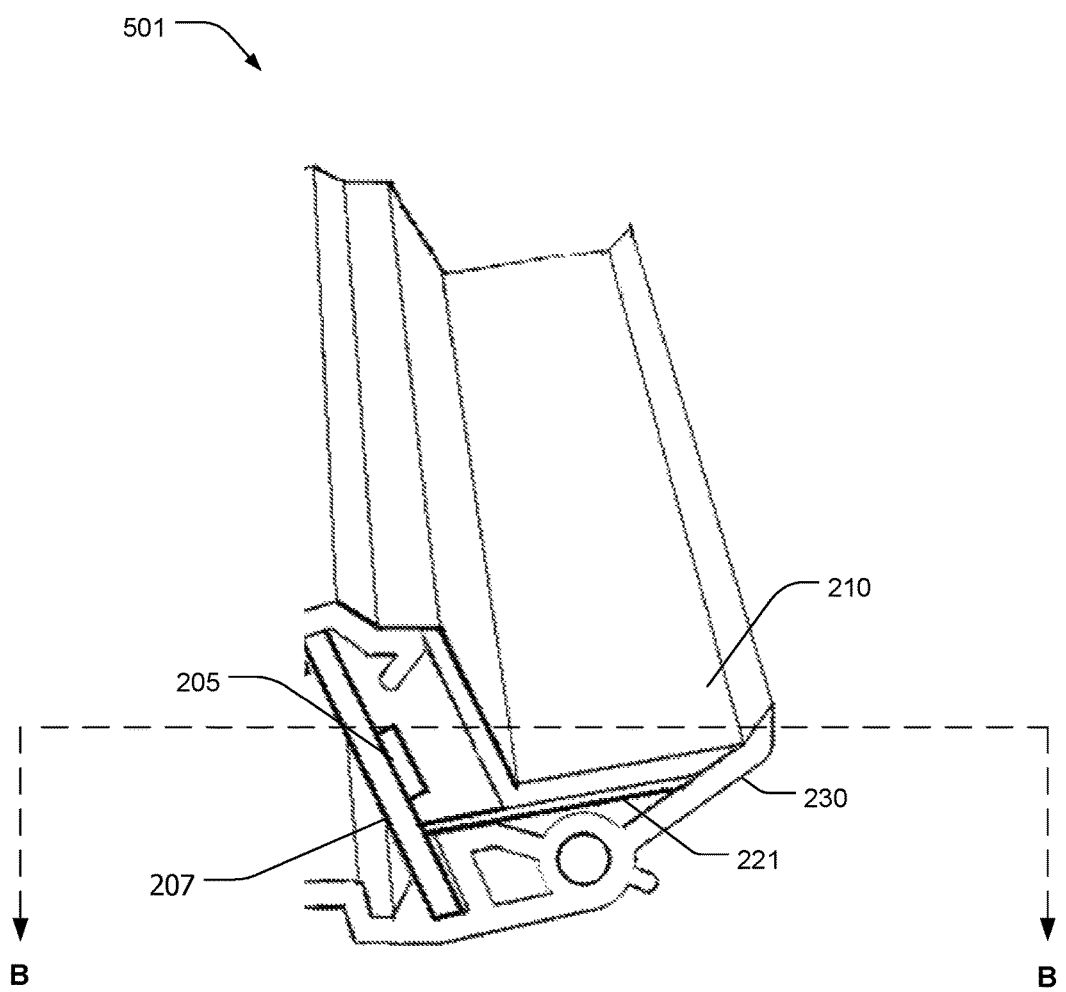
FIG. 5 is a perspective view of the second example lighting configuration.

FIG. 5 shows in perspective view the optical framework 501 based on configurations shown in FIGS. 2B, 2C, 3A, 3B, and 3C, these Figures being cross sectional views seen face-on relative to FIG. 5 arrows B-B. Consistent with said Figures, this design features at least one LED 205, a substrate 207, an L-shaped piece 210, an optional mirrored piece 221, and the shell 230.

The optical framework 501 in FIG. 5 may be placed as a substitute module in place of a prior art module that would otherwise be used as module 160 in FIG. 1A. A mirror image of 501 may be used to substitute for a module 180.

CONCLUSIONS, RAMIFICATIONS, AND SCOPE

It can be seen from the drawings and description that the effect of the optics is to enhance the amount of light being directed toward a target area, even though the unlensed LED characteristics have a wide angle of dispersion. The resulting advantage is that while the lighting is generally concentrated toward a desired area, hot spots are not produced.

While the invention is primarily intended to make use of unlensed LEDs, other light sources with wide dispersion output may be used also. The specific construct may need to be tailored to the particular dispersion of the particular LED or light source, with the shape of each element and the overall construct perhaps differing somewhat from the lengths or angles as shown in the drawings.

Further, though the L-shaped optical elements as described are one piece for ease of construction, other optical variations consisting of more than one piece are possible.

The spirit of the present invention provides a breadth of scope that includes all methods of making and using it. Any variation on the theme and methodology of accomplishing the same that are not described herein would be considered under the scope of the present invention.

What is claimed is:

1. A lighting module comprising:
   a lighting module shell,
   a substrate affixed to said shell,
   lighting elements mounted on said substrate,
   a first optical adapter with a substantially planar cross section,
   a second optical adapter with a substantially planar cross section,
   wherein the first optical adapter is affixed to said shell substantially parallel to said substrate, and
   wherein the second optical adapter is affixed to said shell, off center and at an angle to said first optical adapter, said first optical adapter and said second optical adapter making a substantially L-shaped cross section.

2. A lighting module as in claim 1, further comprising:
   a reflective substantially planar element placed on the side of said second optical adapter distal to said lighting elements.

* * * * *